Aug. 29, 1967             T. W. BAILEY             3,338,016
PLURAL TAPERED REFRACTORY BLOCKS AND TIGHTLY
FITTING METAL CASE THEREFOR
Filed Jan. 28, 1964
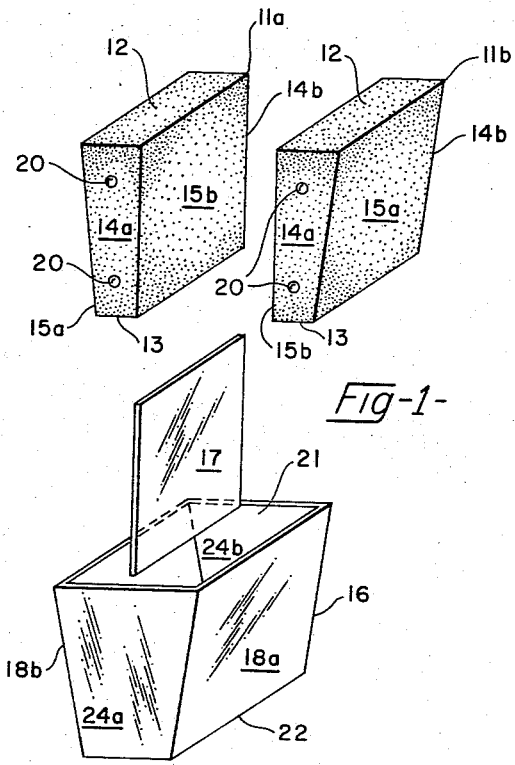
Fig-1-
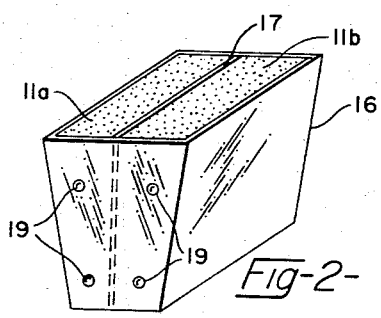
Fig-2-
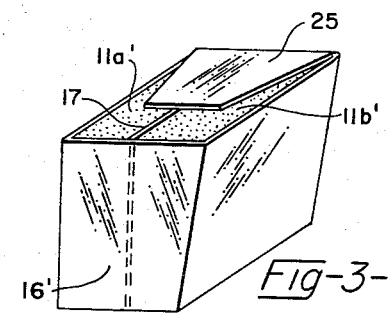
Fig-3-
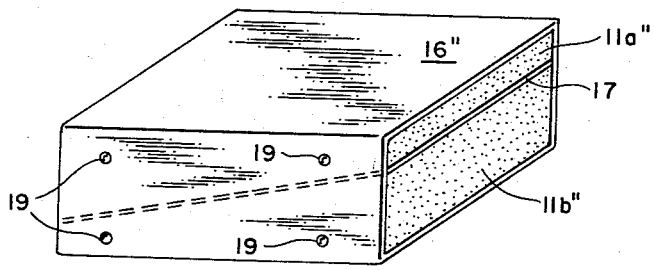
Fig-4-
INVENTOR.
THOMAS W. BAILEY

United States Patent Office 3,338,016
Patented Aug. 29, 1967

3,338,016
PLURAL TAPERED REFRACTORY BLOCKS AND TIGHTLY FITTING METAL CASE THEREFOR
Thomas W. Bailey, Berea, Ohio, assignor to Kaiser Aluminum & Chemical Corporation, Oakland, Calif., a corporation of Delaware
Filed Jan. 28, 1964, Ser. No. 340,611
7 Claims. (Cl. 52—575)

This invention has to do with refractories, especially metal clad refractories, and with a method of making them.

The use of a metal cladding or casings on refractories, particularly those made of basic or non-acid material such as periclase, magnesite, chromite and mixtures of these, is well known, and many methods have been proposed and practiced for attaching such casings. For example, it has been proposed to glue such casings to the brick. In another method, such casings have been welded in place. However, there still remains the problem of obtaining a tight and adherent metal casing on a plurality of preformed refractory shapes, and the art is still looking for improved means to accomplish this end. It is highly desirable that the refractory shape not drop out of the case either during handling, when the falling shape might cause injury to a person handling it, or after its installation in a furnace or other high temperature structure, when the falling of the brick would damage the furnace structure. Furthermore, it has often been found that channels or "chimneys" occur between a metal case and the brick or bricks to which such case is attached, thus permitting escape of combustion gases or other fluid substances from the furnace in which such metal-encased masonry unit is installed.

This invention concerns a refractory unit comprising a plurality of preformed refractory shapes and a tightly fitting metal case therefor, as well as a simple and advantageous method of forming such a refractory unit. The invention will be understood from the following description taken in conjunction with the annexed drawings in which:

FIG. 1 is a perspective view of the various components of a refractory unit according to the invention before assembly into such unit;

FIG. 2 is a perspective view of the assembled refractory unit of FIG. 1;

FIG. 3 shows an alternative embodiment; and

FIG. 4 shows another alternative embodiment.

One embodiment of the refractory or masonry unit according to this invention is shown in FIG. 1, wherein there are provided two preformed refractory shapes, 11a and 11b. Each of these preformed shapes is of tapered configuration. That is, each shape has a larger end face 12 and a smaller end face 13, which in this embodiment are flat or plane surfaces and are generally parallel to each other, and four longitudinal side faces, two of which, 15a and 15b, are flat or plane surfaces which converge toward each other from end face 12 to end face 13. The remaining side faces, 14a and 14b, are flat or plane surfaces and are generally parallel to each other and are of tapered configuration, diminishing in width from end face 12 to end face 13. Preferably, and as shown in FIG. 1, side faces 14a and 14b are of constantly decreasing width in the direction noted. In the embodiment of FIG. 1, side faces 15a and 15b are of substantially constant width from end face 12 to end face 13 in each shape. Alternatively, if desired, these faces can also be tapered, preferably with constantly decreasing width from the larger end face toward the smaller end face.

The metal casing of the refractory or masonry unit of this invention is a preformed tubular metal case 16 which, in the preferred embodiment shown in FIG. 1 for instance, is of tapered configuration. In other words, the metal casing conforms to the exterior surface configuration of the longitudinal side faces of the preformed refractory shapes to be assembled therein. In the embodiment of FIG. 1, metal casing 16 comprises two longitudinal side faces 18a and 18b which are of substantially constant width and are generally rectangular in shape, and which converge toward each other from the large end 21 of the case 16 to the opposite or shall end 22. The remaining two sides of the tubular casing 16 are side faces 24a and 24b which are of tapered configuration extending from end 21 to end 22 of the case and coacting with sides 18a and 18b to form a tubular shape which is of generally rectangular cross-sectional configuration, the cross section of the case being of constantly diminishing area from large end 21 to small end 22, whereby refractory shapes 11a and 11b will be tightly held by the case when fitted thereinto upon assembly of the masonry unit. It will be understood that for purposes of illustration a substantial taper is indicated in the drawings. However, in practice the unit can have a very slight taper, for example a difference in dimensions between larger and smaller ends of a half inch in a six inch width.

The refractory unit of this invention can be assembled by placing the refractory shapes 11a and 11b adjacent each other so that one of the converging side faces 15b of a tapered refractory shape is adjacent, in other words confronting, a substantially coextensive face of another refractory shape, placing the assemblage with the smaller end 13 of the tapered shape in the larger end 21 of the tubular casing 16, and forcing the refractory shapes into the tubular casing under pressure so as to place them into tight and wedged relationship with it. In a preferred embodiment of the invention, a metal plate 17 is placed between the adjacent or confronting faces of the refractory shapes. It will be noted that the converging side face 15a of a tapered refractory shape which is not adjacent or confronting another refractory shape is adjacent or confronting the tubular metal casing. When the refractory shapes are forced into the tubular metal casing, the casing will be stretched and deformed so as to form a tight and closely fitting casing holding the refractory shapes in place.

The term "tubular" is used to indicate that the preformed casing is in the form of a circumferentially joined piece of metal, and not that it is necessarily of circular cross section. In fact, as shown in the preferred embodiment of the drawings, it will preferably be of rectangular across section. The adjoined edges of the metal can be fastened, for example, by welding or riveting, or rolling the metal to interlock the adjoining edges. The tubular casing is open at both ends, at least prior to the insertion of the refractory shapes. It is essential that the tubular casing be open at both ends during assembly with the preformed refractory shapes so that the circumference of the casing can be deformed to closely fit the surfaces of the refractory shapes. In one embodiment, illustrated in FIG. 3, the metal casing is designed to provide extended tabs or flaps 25 that can be folded over the ends of the refractory shapes after assembly. In any event, the casing covers at least the major portion of the exposed side faces of the refractory shapes.

While in the preferred embodiment shown both of the refractory shapes are tapered, in another embodiment, shown in FIG. 3, the unit can be made from one straight shape 11a', that is one with parallel opposite sides, and one tapered shape 11b'. Alternatively also, more than two refractory shapes can be placed within a single tubular casing.

While it is essential that the refractory shape be preformed, that is, formed to a coherent, shaped mass before insertion in the metal casing, the shapes can be either unfired, for example chemically bonded, or fired. Furthermore, it is entirely possible, and may often be desirable, that one of the refractory shapes within a single casing be fired while the other is unfired. Similarly, the shapes within a single casing can be of different chemical composition. For example, one can be a fired periclase shape, while the other can be an unfired chrome periclase mixture, or any other desired combination of compositions can be used.

While the preferred embodiment is shown with a tubular casing of rectangular cross-section and tapered configuration, it is possible to make the casing straight and not tapered, as shown in FIG. 4. In this embodiment it is necessary to use two tapered refractory shapes 11a″ and 11b″ and to insert them, smaller end first, into opposite ends of the tubular casing 16″, again wedging or forcing them into position within the casing.

The metal casing is made of any suitable metal, for example, plain carbon steel or stainless steel, as is known in the art. It will be of sufficient gauge to withstand the stresses involved in the assembly operation. For instance, metal of from 12 gauge to 20 gauge will generally be suitable.

The tapered refractory units shown in the preferred embodiment of this invention are particularly useful in constructing arched roofs of metallurgical or high temperature furnaces, for example open hearth furnaces. However, the units of this invention may be used wherever metal clad refractory shapes are desired.

It is an advantage of this invention that, by it, there is provided a simple and enconomical method of assembling a refractory unit with a tightly applied metal casing which eliminates openings or chimneys between the casing and the refractory shapes within it. It is also an advantage of the invention that, by it, there can be provided a refractory unit with shapes of two different chemical compositions within the same metal case.

If it is desired to further insure against any possible slippage of the refractory shapes out of the metal casing, portions 19 of the metal casing can be dimpled or depressed so as to project into preformed recesses 20 in the side faces of the refractory shapes.

While it is essential, as pointed out above, that a tapered refractory shape be placed within the tubular metal casing with one of its converging side faces adjacent another refractory shape and another converging side face adjacent the metal casing, it will be understood that the tapered refractory shape can have more than two non-parallel or converging flat or plane side faces.

What is claimed is:
1. A refractory unit comprising a tubular sheet metal casing tightly encircling a plurality of preformed refractory shapes, at least one of said refractory shapes being a tapered shape, having a larger end, a smaller end, and at least two converging side faces between said ends, the tapered shape being disposed within said casing with one of said converging side faces in confronting relationship and substantially coextensive with a side face of another refractory shape and another of said converging side faces in tight confronting relationship with the metal casing.

2. A refractory unit comprising a tubular sheet metal casing tightly encircling and covering the major portion of the exposed side faces of a plurality of preformed refractory shapes, at least one of said refractory shapes being a tapered shape having a larger end, a smaller end, and at least two converging side faces between said ends, the tapered shape being disposed within said casing with one of said converging side faces in confronting relationship and substantially coextensive with a side face of another refractory shape and another of said converging side faces in tight confronting relationship with the metal casing, said refractory unit being of tapered configuration.

3. A refractory unit comprising a tubular sheet metal casing tightly encircling and covering the major portion of the exposed side faces of a plurality of preformed refractory shapes at least one of said refractory shapes being a tapered shape having a larger end, a smaller end, and at least two converging side faces between said ends, the tapered shape being disposed within said casing with one of said converging side faces in confronting relationship and substantially coextensive with a side face of another refractory shape and another of said converging side faces in tight confronting relationship with the metal casing, a metal plate being disposed between the confronting faces of said refractory shapes, portions of said casing projecting into preformed recesses in at least one of said refractory shapes.

4. A refractory unit comprising a tubular sheet metal casing tightly encircling and covering the major portion of the exposed side faces of a plurality of preformed refractory shapes at least one of said refractory shapes being a tapered shape having a larger end, a smaller end, and at least two converging side faces between said ends, the tapered shape being disposed within said casing with one of said converging side faces in confronting relationship and substantially coextensive with a side face of another refractory shape and another of said converging side faces in tight confronting relationship with the metal casing, a metal plate being disposed between the confronting faces of said refractory shapes, said refractory unit being of tapered configuration, and portions of said casing projecting into preformed recesses in at least one of said refractory shapes.

5. A refractory unit comprising a tubular sheet metal casing tightly encircling and covering the major portion of the exposed side faces of two preformed refractory shapes, said refractory shapes being of tapered shape and having a larger end, a smaller end, and at least two converging side faces between said ends, the tapered shapes being disposed within said casing with one of said converging side faces in confronting relationship and substantially coextensive with a converging side face of the other refractory shape and another of said converging side faces in tight confronting relationship with the metal casing, a metal plate being disposed between the confronting faces of said refractory shapes, said refractory unit being of tapered configuration, portions of said casing projecting into preformed recesses in said refractory shapes.

6. A refractory unit according to claim 5 wherein said refractory shapes are of different chemical composition.

7. A refractory unit comprising a tubular sheet metal casing tightly encircling and covering the major portion of the exposed side faces of two preformed refractory shapes, said refractory shapes being of tapered shape and having a larger end, a smaller end, and at least two converging side faces between said ends, the tapered shapes being disposed within said casing with one of said converging side faces in confronting relationship and substantially coextensive with a converging side face of the other refractory shape and another of said converging side faces in tight confronting relationship with the metal casing, portions of said casing projecting into preformed recesses in said refractory shapes.

References Cited
UNITED STATES PATENTS

| Re. 25,615 | 7/1964 | Reynolds et al. | 52—599 X |
| 134,622 | 1/1873 | Worrell | 94—11 |
| 2,187,669 | 1/1940 | Stewart | 110—99 |
| 2,465,170 | 3/1949 | Rochow | 52—599 X |
| 3,109,259 | 11/1963 | Viall | 52—224 X |

FOREIGN PATENTS

| 222,017 | 5/1962 | Austria. |
| 1,264,019 | 5/1961 | France. |
| 1,311,675 | 10/1962 | France. |

FRANK L. ABBOTT, *Primary Examiner.*

A. C. PERHAM, *Assistant Examiner.*